Aug. 17, 1937.      G. FAST      2,089,996

BRAKE CONSTRUCTION

Filed Oct. 8, 1932      2 Sheets-Sheet 1

INVENTOR
Gustave Fast
BY H. C. Lisering
ATTORNEY

Aug. 17, 1937.  G. FAST  2,089,996
BRAKE CONSTRUCTION
Filed Oct. 8, 1932  2 Sheets-Sheet 2

INVENTOR
Gustave Fast
BY
H.C. Miesem
ATTORNEY

Patented Aug. 17, 1937

2,089,996

UNITED STATES PATENT OFFICE 2,089,996

BRAKE CONSTRUCTION

Gustave Fast, Lindamoor-on-Severn, Annapolis, Md., assignor to Gustave Fast Engineering Corporation, Annapolis, Md., a corporation of Maryland Application October 8, 1932, Serial No. 636,814

10 Claims. (Cl. 188—72)

This invention relates to brakes applicable to machinery of various sorts, such as hoists, cranes, elevators, automobiles and the like. It has for a primary object the provision of a compact and powerful brake, operable by the application of a relatively small force, but capable of producing a large braking effort. An important feature is the provision of means for establishing a high normal pressure between friction surfaces, which produce the braking action, without the necessity of applying a large operating force.

The improved brake is well suited for application to an automobile and it is herein illustrated as applied to the wheel of such a vehicle. In this adaptation of the invention it has been a further object to provide a brake which may readily be entirely enclosed within a "disc wheel". Another object, of more general bearing, has been the provision of means whereby the brake may be easily and quickly adjusted to meet operating conditions, or to compensate for wear in the braking surfaces.

A particular feature of the invention is the production of a brake which does not require the usual lining of friction material, and which is constantly bathed in lubricant or "brake dressing" to minimize wear. The construction is such that metallic surfaces are forced together under conditions insuring effective contact between a large percentage of the friction faces. This obviates excessive wear at isolated points and greatly increases the life of the structure without replacement of parts. Other objects and advantages will appear from the detailed description now to be given of an illustrative form of the invention in connection with the accompanying drawings, in which Fig. 1 is a vertical, transverse, central section of a vehicle wheel in which the present invention is embodied;

Fig. 5 is an enlarged transverse section of a portion of the mechanism of Fig. 1;

Fig. 6 is an enlarged, transverse, vertical section of another portion of the mechanism of Fig. 1;

Fig. 7 is a development of the cam surfaces on certain of the friction elements and cooperating cam rollers in the positions they assume when the brake is in braking condition.

Fig. 8 is a similar view with the brake in released condition.

Figure 1:
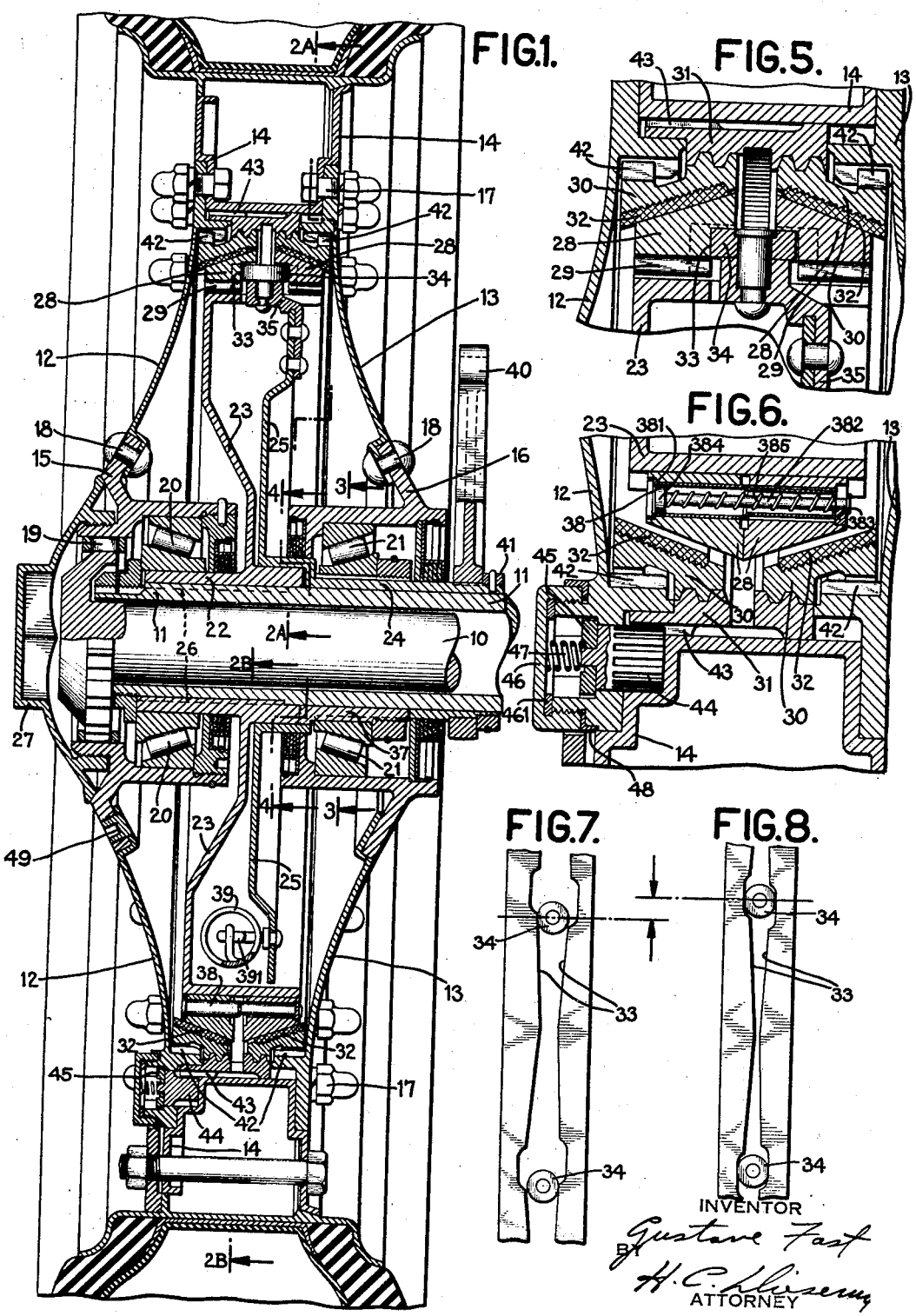

Referring to Fig. 1, the driving axle 10 of the vehicle is suitably enclosed in the usual way within an axle housing 11, upon which the wheel structure to be described is supported. The wheel illustrated is of the enclosed disc type, comprising discs 12 and 13 joined to a felloe 14 by any suitable means, as by bolts 17, and to the bearing housings 15 and 16, respectively, by any suitable means, such as the rivets 18. The bearing housing 15 is splined to the axle 10, as at 19, and rotates therewith, thus transmitting the driving torque of the axle 10 to the wheel and vice versa. The wheel may conveniently be supported at one side upon bearings 20, which are confined between the bearing housing 15 and a sleeve portion 22 of a brake disc 23, and at the other side upon bearings 21, which are confined between the bearing housing 16 and a split sleeve portion 37 of brake disc 23. Brake disc 23 is splined to the axle housing 11, as indicated at 26, and is, therefore, stationary insofar as rotation is concerned. A hub cap 27 may be provided to serve as an oil-tight cover for the hub mechanism.

Inner brake rings 28 are splined to brake disc 23, as at 29 (Fig. 5), so as to be held stationary, rotatively, but are permitted limited axial movement. The brake rings 28 are suitably formed of any material of high resilience or elasticity and good wearing qualities, preferably steel. Outer brake rings 30 are threaded to an adjusting ring 31, suitably carried between the discs 12 and 13 and felloe 14, one of the rings 30 being provided with right hand threads and the other with left hand threads, and the two halves of the adjusting ring 31 being threaded accordingly. It will be apparent that a relative rotation between the adjusting ring 31 and the outer brake rings 30 will move the latter toward or away from each other and thus vary their spacing.

The outer brake rings 30 are preferably formed of resilient material, as in the case of the inner brake rings 28, but they may be advantageously faced with a layer 32 of softer material such as Babbitt metal or soft bronze containing a high percentage of lead, say upwards of 15 per cent., which may be applied in any suitable manner, as by a casting method. The inner surfaces of the resilient metal portion of the rings may be roughened or grooved to better retain the soft metal lining. If the lining is omitted the inner and outer rings should be formed of different resilient materials so as to avoid seizing upon application of the brakes. For example, in that event the inner rings may suitably be formed of cast iron and the outer rings of steel. The outer brake rings are splined to the inner surface of discs 12 and 13 as at 42, so as to be rotated at all times with the wheel. Both the inner and the outer brake rings are complete, unbroken members having their cooperating faces at a comparatively small angle, preferably between 20° and 30°, to the axis of the rings.

Figure 4:
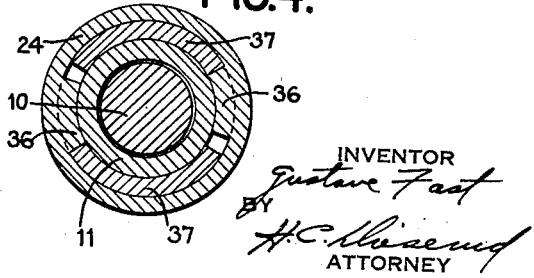
Fig. 4 is a vertical section on line 4—4 of Fig. 1.

Adjacent or opposed edges of the inner brake rings 28 are provided with cam surfaces 33, adapted to be acted upon by cam rollers 34 (Figs. 7 and 8). The latter are positioned at intervals about the periphery of cam disc 25, being journalled in brackets 35, secured to cam disc 25 in any suitable manner, as by the rivets shown. The inner end of the sleeve portion 24 of cam disc 25 is provided with segments 36 which interlock loosely with corresponding segments 37 formed at the inner end of the sleeve portion 22 of brake disc 23 (Fig. 4). Thus the cam disc 25 is permitted a limited angular movement with respect to brake disc 23. This limited movement is sufficient to cause the cam rollers 34 to act upon the cam surfaces 33 of the inner brake rings 28, to force the latter part, axially, and thus cause them to engage, frictionally, the outer brake rings 30. Due to the nature and relationship of the opposed sets of brake rings 28 and 30, it will be apparent that the arrangement disclosed possesses a large mechanical advantage, permitting the application of a relatively large brake pressure. For example, a force applied to the cam disc to turn it relative to the brake disc will produce an amplified axial force upon the rings due to the slope of the cam surfaces 33. At the same time the inclination of the cooperating faces of the rings 28 and 30 is such that the rings will be wedged together and a greater normal or friction producing pressure will be established than the axial force applied to the rings.

Preferably an even number of cam rollers 34 is provided, the cam surfaces 33 of the respective inner brake rings 28 being so positioned with respect to each other and to the cam rollers that alternate rollers will engage one of the rings 28 while the intervening rollers will engage the opposite ring 28. This enables the rollers 34 to cooperate with the cam surfaces with a true rolling action rather than a sliding action as would be the case if each roller engaged both brake rings 28 at the same time. In the drawings a construction embodying six rollers is illustrated, three rollers cooperating with each ring 28 and tending to force it away from the median plane.

Spring cartridges 38 serve to draw the inner brake rings 28 together when the brake is in the released position, the spring tension thus exerted also serving to center the inner brake rings against the cam rollers 34, retaining them in the position shown in Fig. 8. Each cartridge is provided with a shoulder 381 cooperating with a seat formed in one of the rings. A rod 382 has a neck passing through an opening in a washer 383 seated in a similar recess in the other of the rings. The rod is provided with an enlarged head at one end engaging the outer surface of the washer and a piston portion 384 at its other end, adapted to slide in the cartridge. A spring 385 is compressed between the piston portion 384 and an inturned flange at the right end of the cartridge (Fig. 6), thus serving to draw the rings 28 together, as explained. A spring 39 connected between a stud or hood 391 extending from the cam disc and a stud 392 on the brake disc, maintains the cam disc 25 in the released position except when the latter is held against the tension of spring 39 by the application of a force to an operating lever 40. The latter may be secured to the sleeve portion 24 of the cam disc 25 in any convenient way, as by being splined thereto and being retained by any suitable means, such as a collar 41. If desired a plurality of springs 39 may be provided to release the brake.

Figure 2:
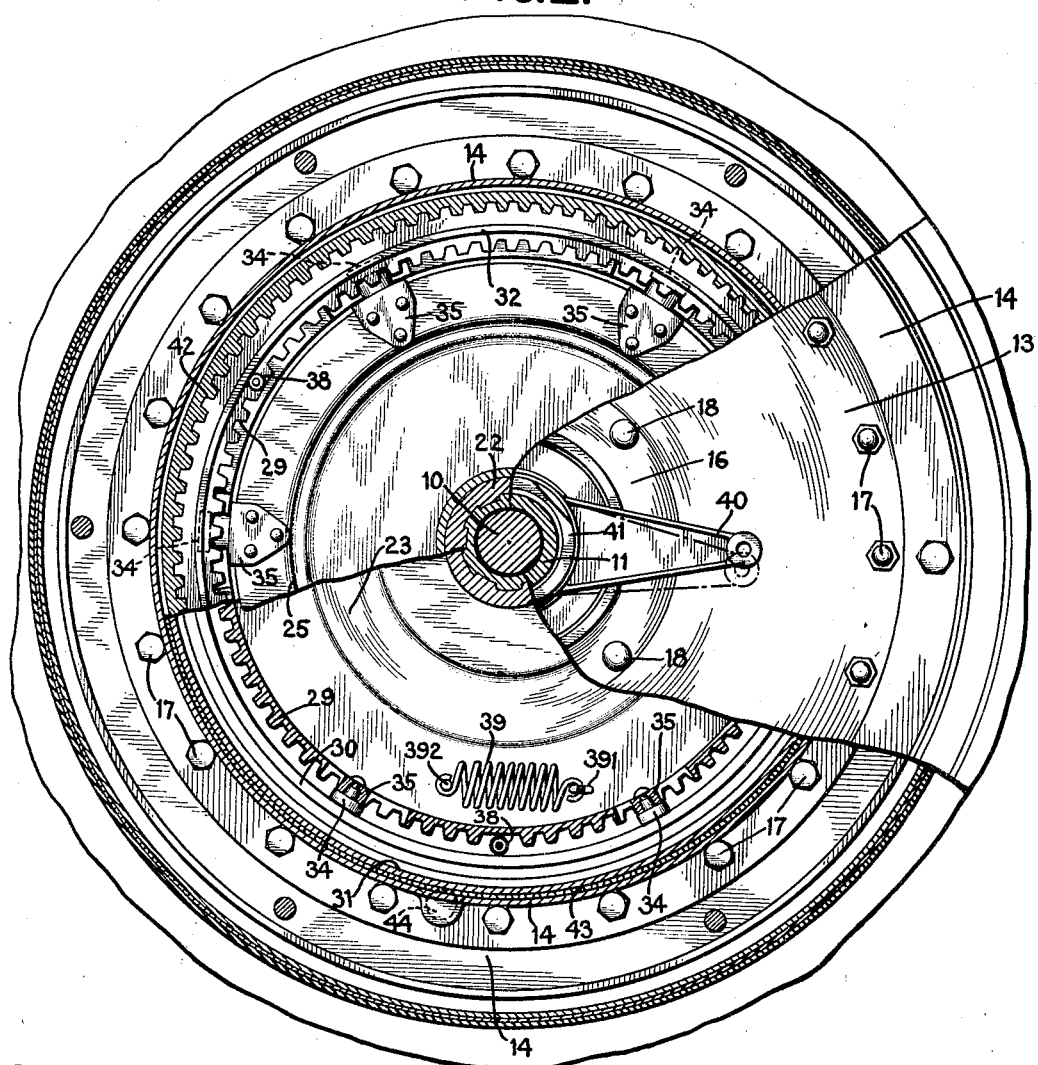
Fig. 2 is a side view, with the portion at the right in elevation, the upper portion in section on line 2A—2A of Fig. 1, and the lower portion in section on line 2B—2B of Fig. 1.
Figure 3:
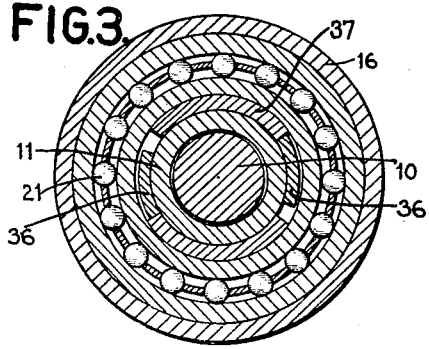
Fig. 3 is a vertical section on line 3—3 of Fig. 1.

It is apparent that if operating lever 40 is moved in a counter-clockwise direction, from the dotted to the full line position of Figure 2, carrying with it the cam disc 25, the cam rollers 34 will spread the inner brake rings 28, causing each of them to engage the corresponding outer brake ring 30, with a pressure greatly in excess of that applied to the lever, thus producing a strong braking action. By properly designing the cam surfaces 33 to increase their mechanical advantage the friction producing pressure available may be brought to a very high value. This will of course necessitate providing for a correspondingly long stroke of the operating lever 40. The effect of wedging the rings 28 and 30 together and setting up a resulting high pressure between them is to tend to radially expand the outer rings 30 and radially compress or contract the inner rings 28, thereby removing irregularities in the surfaces of the rings and in effect truing them up by establishing certain elastic stresses and strains in the resilient material of the rings. This, then serves to bring a greater percentage of the friction faces into intimate contact and therefore provides for a wide and even distribution of the braking effort. The wear on any particular portions of the rings will be minimized and the life of the structure increased. Provision of the soft metal surface on one of each pair of cooperating rings serves to insure an even greater area of effective contact between the rings by elimination of minor surface irregularities. When the force is removed from the lever 40, the spring 39 will move the cam disc 25 to the released position and spring cartridges 38 will press the inner brake rings 28 together, into their central positions, thus entirely eliminating friction between the stationary and the rotating braking surfaces.

By the means now to be described, the outer brake rings 30 may be adjusted toward or away from each other, so as to compensate for wear of the braking surfaces. As already explained, the two outer brake rings 30 are threaded to the adjusting ring 31 by right and left-handed threads, respectively. Therefore, by relative rotation between the adjusting ring 31 and the brake rings 30, the desired adjustment of the latter may be effected.

Adjusting ring 31 is provided, upon its periphery, with gear teeth 43, which mesh with similar teeth on a pinion 44 journalled near the periphery of disc 12. It will be seen that any rotation of the pinion 44 will cause a rotation of adjusting ring 31 relative to the wheel and to the rings 30 which are splined to the wheel, so that the desired adjustment will be effected. The pinion 44 may be locked in any adjusted position by means of a washer 45, or by other suitable means. An oiltight cap 46 serves to cover the aperture provided for access to the pinion 44 and serves to squeeze a washer or gasket 461 against a boss on the disc 12 through which the aperture is formed. A spring 47 within the cap may serve to hold the washer 45 in locking position. The cap may be locked in place by a washer 48.

A slight clearance is preferably provided in the assembly of the parts to permit the cam disc 25 to partake of a limited lateral play. This will insure an even distribution of the pressure against the two rings 28 since an excess of pressure against one will result in a lateral shifting of the cam disc and its sleeve until the pressure is equalized.

The space within the wheel between the discs is adapted to be filled with a suitable lubricant or brake dressing through an opening normally closed by a plug 49. The interior of the wheel is made as nearly oiltight as possible. Presence of the brake dressing will serve to preserve and prevent undue wear of the brake surfaces and will insure a smooth action of the brake. When the brake is applied the lubricant between the friction faces will be in such a thin film that its resistance to shear will cause the necessary braking action. Separate lubrication is preferably provided for the bearing units 20 and 21, the ends of the housings 15 and 16 being sealed by suitable packing means for this purpose.

It is apparent that the present invention may be applied to machines other than vehicles, by means of slight modifications of the illustrative structure described. It may also be applied to advantage with slight change to a dynamometer which is in effect a continuous brake provided with means for registering or recording the torque.

The terms and expressions employed in the foregoing specification are terms of description and not of limitation, and I do not desire to be restricted to the particular construction described and illustrated, since various modifications of the same may be made without departing from the scope of my invention.

What I claim is:

1. In a structure of the class described a rotating member, a non-rotating member, friction elements associated with said rotating member, opposing friction elements associated with said non-rotating member, the friction elements associated with one of said members being movable axially toward and away from each other, cam surfaces formed upon the adjacent edges of said axially movable friction elements, cam rollers movably mounted between said cam surfaces, and means for causing said cam rollers to traverse said cam surfaces through a limited arc and shift said elements axially to cause engagement of the cooperating friction faces, certain of said rollers being arranged to engage only one of said elements and other of said rollers being arranged to engage only another of said elements.

2. In a structure of the class described, a rotating member, a non-rotating member, friction elements associated with said rotating member, opposing friction elements associated with said non-rotating member, certain of said friction elements being movable axially toward and away from each other, cam surfaces formed upon the adjacent edges of said certain friction elements, a supporting member, cam rollers mounted upon said supporting member adjacent said cam surfaces, and means for moving said supporting member through a limited arc to cause said cam-rollers to engage said cam surfaces and shift said certain elements axially into engagement with the other friction elements each of said rollers engaging the cam surface of only one of said elements.

3. In a structure of the class described, a rotative member, a non-rotative member, friction elements associated with said rotative member, opposing friction elements associated with said non-rotative member, settable means for adjusting certain of said friction elements toward and away from each other, and means for shifting the other of said friction elements in opposite directions into engagement with said certain friction elements.

4. In a structure of the class described, a rotative member, a non-rotative member, friction elements associated with said rotative member, opposing friction elements associated with said non-rotative member, rotatable means for adjusting certain of said friction elements toward and away from each other, and means for moving the other of said friction elements axially in opposite directions to engage said certain friction elements.

5. In a structure of the class described, a rotative member, a non-rotative member, friction elements associated with said rotative member, opposing friction elements associated with said non-rotative member, settable means for adjusting said first mentioned friction elements toward and away from each other, means for maintaining said opposing friction elements out of engagement with said first mentioned friction elements, and means for moving said opposing friction elements in opposite directions into engagement with said first mentioned friction elements.

6. In a structure of the class described, a rotative member, a non-rotative member, friction elements associated with said rotative member, opposing friction elements associated with said non-rotative member, cam surfaces formed on the adjacent edges of said opposing friction elements, cam rollers supported between the adjacent cam surfaces, means for maintaining said opposing friction elements in engagement with said cam rollers, and means for causing alternate cam rollers to act upon the cam surfaces of only one of the opposing friction elements and the other cam rollers to act only upon the cam surfaces of the other opposing friction element to move said elements axially apart and into engagement with the first mentioned elements.

7. In a brake construction a rotatable member, a non-rotatable member, a plurality of unbroken, resilient rings between said members, certain of said rings being positively connected with each of said members, said rings having cooperating friction faces inclined at a minor angle to the axis of the rings, certain of said rings being subjected to compressing forces, and means for shifting said rings axially to wedge them together.

8. In a brake construction a rotatable member, a non-rotatable member, a plurality of unbroken, resilient rings between said members, certain of said rings being positively connected with each of said members, said rings having cooperating friction faces inclined at a minor angle to the axis of the rings, certain of said rings being subjected to expanding forces and others to compressing forces, the inclined faces of the rings connected with one of said members being provided with a soft metal surface, and means for shifting said rings axially to wedge them together.

9. In a brake construction a rotatable member, a non-rotatable member, a plurality of unbroken, resilient rings between said members, certain of said rings being positively connected with each of said members, said rings having cooperating friction faces inclined at a minor angle to the axis of the rings, certain of said rings being subjected to expanding forces and others to compressing forces, spring means for normally holding the inclined faces of said rings out of engagement, and means for shifting said rings axially to wedge them together.

10. A vehicle brake comprising a set of unbroken friction rings connected to turn with a wheel of the vehicle, a set of unbroken rings within the first mentioned rings held against rotation, the rings of each set having friction faces inclined to the axis of the rings and adapted to cooperate with the corresponding faces of the other set, an oil tight enclosure surrounding said sets of rings, and means for forcing the rings of one set toward those of the other to engage said inclined faces and produce an expanding force on said first mentioned rings and a compressing force on the second mentioned rings.

GUSTAVE FAST.